(No Model.)  2 Sheets—Sheet 1.

C. E. MARIS.
BRAKE FOR HOISTING MACHINES.

No. 554,131.  Patented Feb. 4, 1896.

Witnesses:  Inventor:
  Charles E. Maris
  by his Attorneys

UNITED STATES PATENT OFFICE.

CHARLES E. MARIS, OF PHILADELPHIA, PENNSYLVANIA.

BRAKE FOR HOISTING-MACHINES.

SPECIFICATION forming part of Letters Patent No. 554,131, dated February 4, 1896.

Application filed December 28, 1894. Serial No. 533,200. (No model.)

*To all whom it may concern:*

Be it known that I, CHARLES E. MARIS, a citizen of the United States, residing in Philadelphia, Pennsylvania, have invented certain Improvements in Brakes for Hoisting-Machines, of which the following is a specification.

My invention consists of a combined positive and frictional braking device, intended to work automatically, for the purpose of preventing backlash or backward rotation of the driven shaft of hoists when it is desired to stop the transit of the load, whether in raising or lowering the same.

Figure 1:
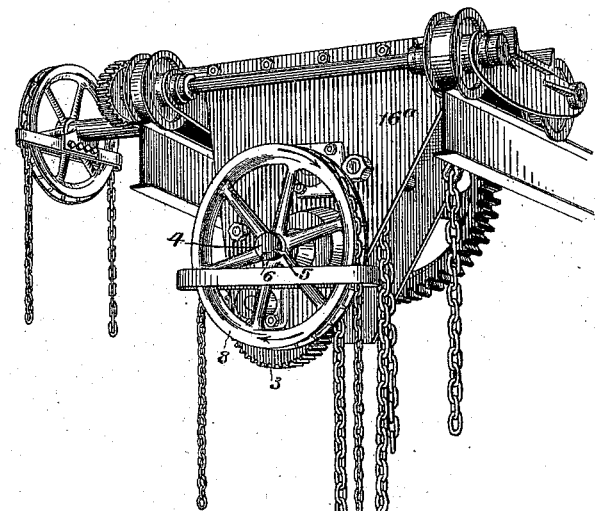
Figure 5:
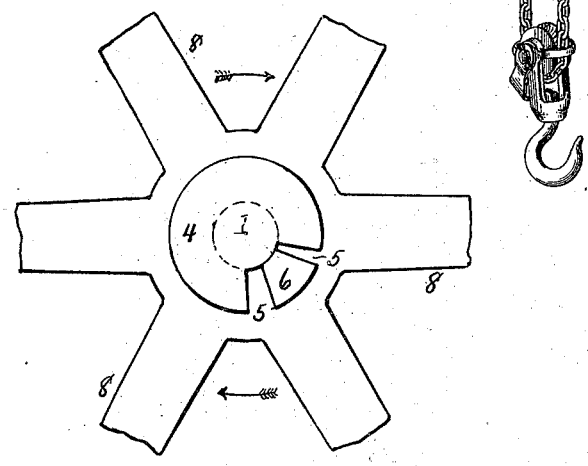

In the accompanying drawings, Figure 1 is a perspective view of an ordinary traveling hoist provided with my improved braking device. Fig. 2 is a longitudinal section of my improved braking device. Figs. 3 and 4 are perspective views of detached portions of my invention, and Fig. 5 is a detached view in elevation of a part of my invention.

In hoists of nearly all descriptions much difficulty has heretofore been experienced in providing suitable means to prevent the descent of the load at times when it is desired to arrest the transit of the same for any purpose whatsoever, whether in raising or lowering the load.

Positive clutches are not available since their efficiency would become impaired in a very short time, owing to the braking strain to which they would be subjected every time they were operated. Frictional clutches are not entirely practicable since their abutting faces become so worn in time as to be practically worthless; but by combining these two forms of clutches I am enabled to devise an automatic brake for hoists that is at once efficient and practical, which is composed of few parts, and which may be operated without any additional chain or lever, thus lessening the liability of its getting out of order.

While I have shown my braking device as applied to a traveling hoist in which power is applied to the hoisting-shaft by means of a hand-wheel and chain, it will be understood that I do not wish to limit myself to this specific form of hoist, as my braking device with but slight modifications may be applied to all forms of hoists now constructed.

In the accompanying drawings, 1 represents the driving-shaft of my braking device, provided with a pinion 2 fast on said shaft and meshing with a gear-wheel 3 on the drum-shaft of the hoist. On the end of the shaft 1 is a head 4, having a notch 5 therein which is engaged by a lug 6 on the face of the hub 7 of the hand chain-wheel 8. The opposite side $7^a$ of the hub 7 of this hand chain-wheel extends some distance into the sleeve 9 of the casing 10, which has an internally-beveled face 11, against which the beveled face $12^a$ of the friction-drum 12 impinges. This friction-drum 12 is provided on either side with the clutch-hubs 13 and 14, each having on its outer face cams $13^a$ and $14^a$, respectively. The hub 13 has three such cams of a pitch or slant not exceeding fifteen degrees, and these engage with cams of a similar pitch on the hub $7^a$ of the hand chain-wheel 8. The hub 14 is provided with cams of a pitch or slant about twice that of the cams on the hub 13, and these cams are engaged by a cam-collar 15 provided with similar cams and keyed to the shaft.

The hand chain-wheel 8 is loose on the shaft 1, but being provided with the lug 6, which engages with the notched head of said shaft 1, it turns with the shaft. The hand chain-wheel, however, has a slight movement in both directions corresponding to the space between the ends of the lug 6 and the ends of the notch 5 in the head 4.

The friction-drum 12 is formed with a slight spiral groove $12^b$ on its face $12^a$ to allow for the escape of air and surplus oil from between the casing and the face of the friction-drum, so as to prevent any cushioning of the same within the casing which would impair the ready action of the device.

In the hoist shown in Fig. 2 the plate 16 forms the backing for the cam-collar 15 and also closes up the back of the casing 10, while in the hoist shown in Fig. 1 this is accomplished by the front plate, $16^a$, of the hoist-frame.

The operation of this device is as follows: If power is applied to the hand chain-wheel 8 to rotate it from left to right, as indicated by the arrows in Fig. 1, the first part of the movement—that is to say, while the lug on the wheel is traveling in the recess in the head 4 of the shaft—is devoted to turning the abrupt faces of the clutch-hub 7ª and clutch-hub 13 toward each other, so as to carry their cam-faces away from each other, it being understood that there is sufficient lost motion between the abrupt faces of these cams to permit this. As soon as the lug 6 strikes the end of the recess 5 in the head 4, the shaft 1 is caused to turn in the direction of the arrow $x$, Fig. 2, so as to lift the load, the friction-drum 12 turning loosely with the shaft. As soon as there is a cessation of the application of power to the hand chain-wheel 8 the weight of the load tends to turn the shaft in the direction of the arrow $y$, Fig. 2; but this movement causes the cams of the cam-collar 15 to act upon those of the hub 14 of the friction-drum 12 and force the same into frictional contact with the inner face of the casing 10, so as to prevent any lowering of the load, such movement of the friction-drum causing the separation of the abrupt faces of the cams 7ª and 13 and the approach of the inclined faces of the same. When it is desired to positively lower the load the hand chain-wheel 8 is turned from right to left or in a direction the reverse of the arrows shown in Fig. 1, the effect of this being to cause the cams of the clutch 7ª to force the friction-drum 12 inward and back off the cams of the collar 15 owing to the less pitch and consequently greater leverage of the cams of the clutch-hub 7ª as compared with those of the cam-collar 15, and as soon as the application of power to the hand chain-wheel 8 ceases the cams of the hub 15 again act upon those on the hub of the friction-drum 12 to force the latter into frictional contact with the inner face of the casing 10, and arrest the downward movement as before, the lost motion between the lug 6 and the ends of the recess in the head 4 permitting the backing off of the clutch-hub 7ª as the friction-drum is thus moved.

Instead of using the cup form of friction-brake, which I have shown and described, I can, as will be evident, use other forms of friction-brake, if desired. For instance, the disk form of brake may be used—that is to say, a brake composed of a series of rings or disks free to be moved into contact with each other by the cam-collar 15, alternate rings or disks engaging with the outer fixed casing, so as to be incapable of turning therein.

Having thus described my invention, I claim and desire to secure by Letters Patent—

1. The combination in a hoist, of the driving-shaft, mechanism for operating the same including a hand chain-wheel, a sliding friction-brake, a brake-surface on the fixed structure, and two cams, one secured to the driving-shaft, and the other mounted thereon so as to have a slight lost motion, the first cam being adapted to act upon an engaging portion of the sliding brake to move said brake toward the fixed brake-surface when the load tends to lower itself, and the second cam being adapted to act upon an engaging portion of the said sliding brake in order to move its braking-surface away from such fixed surface when the load is lowered through the medium of the hand chain-wheel, the latter cam-surface being of less pitch than the former.

2. An automatic braking device for hoists comprising the driving-shaft, a fixed casing surrounding the same, a friction-drum loose on said shaft within said casing, and having a hub provided with cam-surfaces on each side of said friction-drum, a fixed cam on the driving-shaft adapted to engage with a cam on a hub of the friction-drum to move the same into engagement with the fixed casing, and a cam mounted on the driving-shaft so as to have lost motion thereon, and adapted to engage with a cam on the hub of the drum to move the latter out of engagement, substantially as specified.

3. In an automatic brake for hoists, the driving-shaft, a notched head on the same, a hand chain-wheel loosely mounted on said shaft and provided with a lug adapted to engage with said notched head, a fixed casing surrounding said shaft, a friction-drum loosely mounted on the driving-shaft within said fixed casing, cam-surfaces on the hubs of said friction-drum, the inner end of the hub of the hand chain-wheel provided with cams engaging one of the hubs of the friction-drum, and a cam-collar, as 15, keyed to the driving-shaft and engaging the opposite hub of the friction-drum, substantially as and for the purpose set forth.

4. In an automatic brake for hoists, the driving-shaft, a fixed cup-like casing surrounding the same, and a cup-shaped friction-drum within said casing loosely mounted on the driving-shaft and adapted to engage the cup of the fixed casing, one of said cups being provided with an open-ended continuous spiral groove on its beveled face for the purpose of preventing the cushioning of air and oil between the engaging surfaces, substantially as described.

In testimony whereof I have signed my name to this specification in the presence of two subscribing witnesses.

CHAS. E. MARIS.

Witnesses:
  FRANK MARIS,
  RICHARD WALKER.